(12) United States Patent
Jacobsen

(10) Patent No.: US 11,578,696 B2
(45) Date of Patent: Feb. 14, 2023

(54) METHOD FOR DETERMINING THE AVAILABLE POWER OF A WIND PARK, AND CORRESPONDING WIND PARK

(71) Applicant: Wobben Properties GmbH, Aurich (DE)

(72) Inventor: Jörn Jacobsen, Aurich (DE)

(73) Assignee: Wobben Properties GmbH, Aurich (DE)

( * ) Notice: Subject to any disclaimer, the term of this patent is extended or adjusted under 35 U.S.C. 154(b) by 587 days.

(21) Appl. No.: 16/492,865

(22) PCT Filed: Mar. 9, 2018

(86) PCT No.: PCT/EP2018/055887
§ 371 (c)(1),
(2) Date: Sep. 18, 2020

(87) PCT Pub. No.: WO2018/162706
PCT Pub. Date: Sep. 13, 2018

(65) Prior Publication Data
US 2021/0262441 A1   Aug. 26, 2021

(30) Foreign Application Priority Data
Mar. 10, 2017   (DE) ...................... 10 2017 105 165.1

(51) Int. Cl.
*F03D 7/04*   (2006.01)
*F03D 7/02*   (2006.01)

(52) U.S. Cl.
CPC ............. *F03D 7/048* (2013.01); *F03D 7/028* (2013.01); *F03D 7/045* (2013.01); *F03D 7/046* (2013.01);
(Continued)

(58) Field of Classification Search
CPC .......... F03D 7/045; F03D 1/00; F03D 7/0224; F03D 7/048
See application file for complete search history.

(56) References Cited

U.S. PATENT DOCUMENTS 9,518,561 B2   12/2016  De Boer et al.
10,415,545 B2   9/2019  Kjær et al.
(Continued)

FOREIGN PATENT DOCUMENTS

CN   103390106 A   11/2013
CN   106062358 A   10/2016
(Continued)

OTHER PUBLICATIONS

Göçmen et al., "Uncertainty Quantification of the Real-Time Reserves for Offshore Wind Power Plants", DTU Wind Energy, Technical University of Denmark, WindEurope Summit, Oct. 17, 2016, 17 pages.
(Continued)

*Primary Examiner* — Ronald D Hartman, Jr.
(74) *Attorney, Agent, or Firm* — Seed Intellectual Property Law Group LLP

(57) ABSTRACT

A method for determining an available power of a wind farm, wherein the wind farm comprises a plurality of wind power installations with a rotor having rotor blades, the blade angle of which can be adjusted is provided. A wind farm which is set up to carry out the method for determining an available power is provided. The method comprises providing a shading matrix which determines at least one effective wind speed of each of the wind power installations in the wind farm as a function of at least one wind speed and wind direction and wind farm throttling using a park wake model. The method makes it possible to accurately deter-
(Continued)

Figure 1:
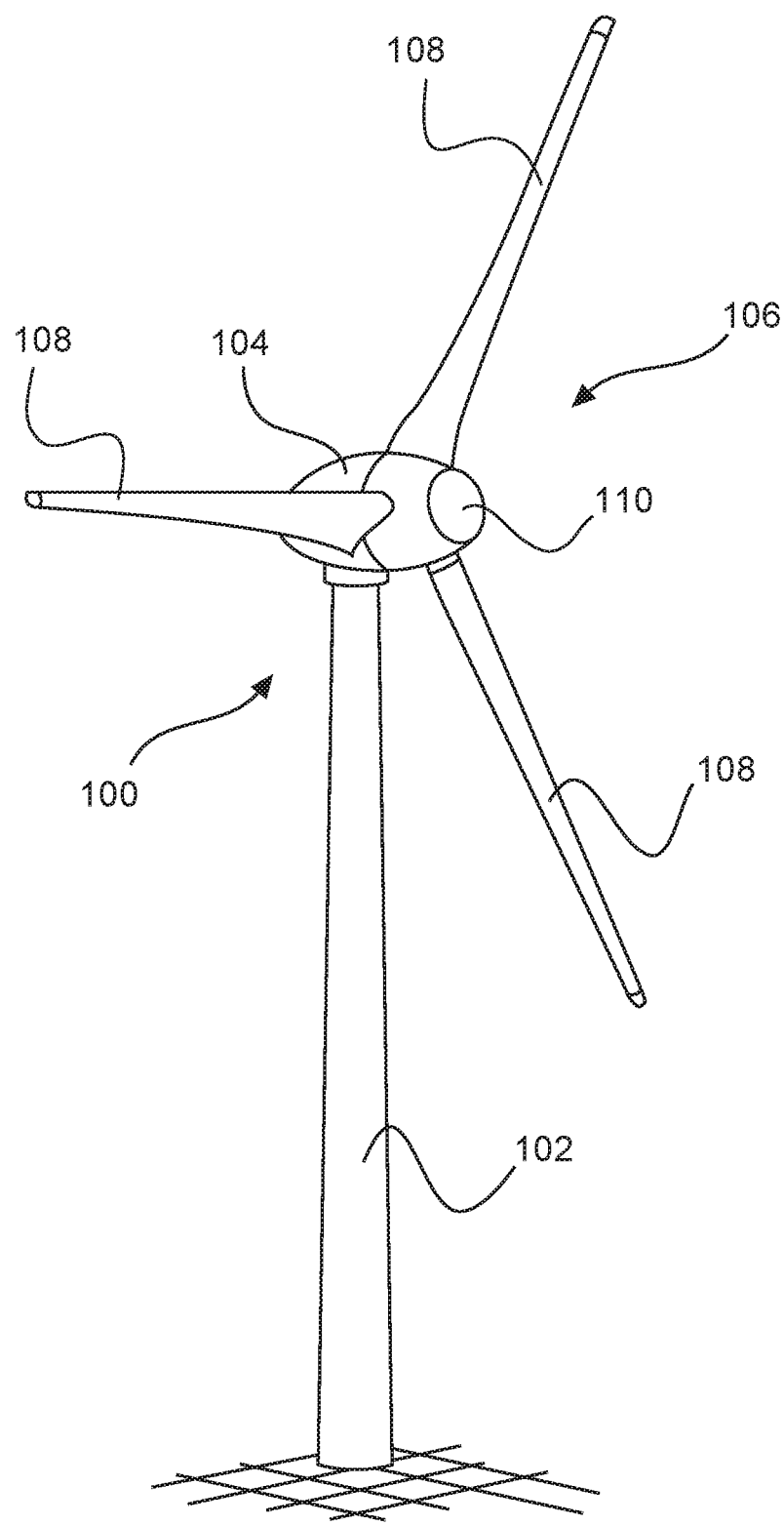

mine an available power of a wind farm even when the wind farm is operated with throttled power.

22 Claims, 9 Drawing Sheets

(52) U.S. Cl.
CPC ..... *F05B 2260/821* (2013.01); *F05B 2260/84* (2013.01)

(56) References Cited

U.S. PATENT DOCUMENTS

| | | | | |
|---|---|---|---|---|
| 10,815,967 | B2* | 10/2020 | Geisler | F03D 1/00 |
| 2006/0131889 | A1* | 6/2006 | Corten | F03D 7/048 |
| | | | | 290/43 |
| 2006/0232073 | A1* | 10/2006 | Corten | F03B 15/06 |
| | | | | 290/44 |
| 2013/0166082 | A1* | 6/2013 | Ambekar | F03D 7/048 |
| | | | | 700/287 |
| 2013/0317748 | A1 | 11/2013 | Obrecht et al. | |
| 2015/0308416 | A1* | 10/2015 | Ambekar | F03D 17/00 |
| | | | | 700/287 |
| 2016/0215759 | A1* | 7/2016 | Fleming | F03D 7/046 |
| 2016/0230741 | A1* | 8/2016 | Brath | F03D 7/0224 |
| 2017/0321660 | A1* | 11/2017 | Atzler | F03D 7/0224 |
| 2017/0370348 | A1* | 12/2017 | Wilson | F03D 7/0224 |
| 2018/0030955 | A1* | 2/2018 | Vaddi | F03D 17/00 |
| 2018/0073486 | A1 | 3/2018 | Zhang et al. | |
| 2019/0120208 | A1* | 4/2019 | Geisler | F03D 7/045 |
| 2021/0047999 | A1* | 2/2021 | Gebraad | F03D 7/0204 |
| 2021/0363969 | A1* | 11/2021 | Egedal | F03D 7/0292 |

FOREIGN PATENT DOCUMENTS

| | | | |
|---|---|---|---|
| DE | 102012013591 A1 | 1/2014 | |
| EP | 2927484 A1 * | 10/2015 | ............ F03D 17/00 |
| EP | 3096004 A1 | 11/2016 | |
| EP | 3121442 A1 * | 1/2017 | ............ F03D 17/00 |
| JP | 6037302 B2 | 12/2016 | |
| KR | 20140057029 * | 5/2014 | ............ F03D 7/028 |
| RU | 2578251 C2 | 3/2016 | |
| WO | WO-0166940 A1 * | 9/2001 | ........... F03D 7/0224 |
| WO | 2016/023271 A1 | 2/2016 | |

OTHER PUBLICATIONS

Johnson et al., "Control of Variable-Speed Wind Turbines—Standard and Adaptive Techniques for Maximizing Energy Capture", IEEE Control Systems Magazine, Jun. 2006, pp. 70-81.

Ortega et al., "A Globally Convergent Wind Speed Estimator for Windmill Systems", 2011 $50^{th}$ IEEE Conference on Decision and Control and European Control Conference (CDC-ECC), Orlando, FL, USA, Dec. 12-15, 2011, pp. 6079-6084.

Soltani et al., "Estimation of Rotor Effective Wind Speed: A Comparison", IEEE Transactions on Control Systems Technology, vol. 21, No. 4, Jul. 2013, pp. 1155-1167.

Verrelli et al., "On-Line Identification of Winding Resistances and Load Torque in Induction Machines", IEEE Transactions on Control Systems Technology, vol. 22, No. 4, Jul. 2014, pp. 1629-1637.

Feijóo et al., "Contribution to wind farm power estimation considering wind direction-dependent wake effects", Wind Energy, vol. 20, No. 2, Jun. 30, 2016, pp. 221-231.

Lebioda et al., "Investigation of Disposable Reserve Power in a Large-Scale Wind Farm", Power Tech, 2005 IEEE Russia, Jun. 27, 2005, pp. 1-6.

Mirzaei et al., "Estimation of the Possible Power of a Wind Farm", Proceedings of the 19th World Congress the International Federation of Automatic Control, Cape Town, South Africa, Aug. 24-29, 2014, pp. 6782-6787.

* cited by examiner

METHOD FOR DETERMINING THE AVAILABLE POWER OF A WIND PARK, AND CORRESPONDING WIND PARK

BACKGROUND

Technical Field

The present invention relates to a method for determining an available power of a wind farm. The present invention also relates to a wind farm which is set up to carry out the method for determining an available power.

Description of the Related Art

Wind power installations are known and are used to generate electrical power from wind and to feed said power into an electrical supply network. In this case, the electrical power to be fed in may fluctuate for various reasons; for example, throttling may be required due to the network.

Both the network and the installation operators therefore increasingly require the installations to determine a so-called "available power" which can also be referred to as "P-available". Whereas the network operator is generally interested in which control reserves are available in the network, the operator is primarily interested in finding out how much income is lost by different limitations. However, the network operator is not helped by knowing only the power contained in the wind if the installation must run in a limited manner, for example as a result of technical problems, and the operator cannot demand this power available in the wind.

However, the operator is interested, for example, in how much power is contained in the wind and how much income he loses as a result of a limitation of the installation. In this case, the question then again arises of who is responsible for these different possible limitations, up to 28 or more of which can be identified, and what proportion of the income losses is borne by what limitation, that is to say who must pay for the resulting costs and in what proportion.

In order to reimburse a reserve power or else in the case of a network-related power reduction, a "P-available" signal is demanded more and more frequently not only for the individual installations but for the entire wind farm. In the event of a power reduction, an increased wind speed than in the non-reduced case acts on wind power installations in the wake of other installations. An estimation of "P-available" on the basis of measured wind speeds would therefore result in an overestimation of the available farm power since farm effects are not taken into account.

BRIEF SUMMARY

At least one embodiment is directed to accurately determining an available power of a wind farm even when the wind farm is operated with throttled power.

Provided is a method for determining an available power of a wind farm is provided, wherein the wind farm comprises a plurality of wind power installations with a rotor having rotor blades, the blade angle of which can be adjusted. The method comprises providing or using a shading matrix which determines at least one effective wind speed of each of the wind power installations in the wind farm as a function of at least one wind speed and wind direction and wind farm throttling using a farm wake model. The method determines the available power of the wind farm on the basis of the effective wind speed.

The shading matrix which is defined in this form advantageously makes it possible to take into account the farm effects which previously resulted in an overestimation of the available farm power. Depending on the wind speed and wind direction and the wind farm throttling, an effective wind speed of the respective wind power installation in the farm can be determined, which effective wind speed indicates what wind speed would be available for this installation if the farm were not operated in a throttled manner. The wind speeds which are reduced in an unthrottled farm, called effective wind speeds, can therefore be advantageously determined on the basis of the shading matrix. The available power can then be determined for the entire wind farm using alternative methods on the basis of the effective wind speeds of the individual installations.

The effects of the shading, which is referred to as a shading matrix and can be stored, for example, as a table or as a matrix in the individual wind power installation or in a farm controller, are calculated in advance for different wind speeds and directions taking the farm wake model into account. As a result of the fact that only the precalculated value can then be looked up on the basis of the shading matrix in order to determine the effective wind speeds, time-consuming simulation of the wake effects at the time at which the available power of the wind farm is to be provided is dispensed with. The available power of the wind farm can therefore be provided substantially without delay.

The shading matrix is provided for the method either on a farm controller or a controller of an individual wind power installation and is directly used for calculations. Alternatively or additionally, the shading matrix is used to calculate further relevant variables, as described with reference to further embodiments, without the shading matrix then having to be immediately provided for the purpose of determining the available power.

According to a first method a), the method for determining the available power comprises the following steps:

determining the wind power installations with freely inflowing wind for a particular wind direction, ascertaining an average wind speed and wind direction as an average value of the undisrupted wind speeds and wind directions of the wind power installations with freely inflowing wind, ascertaining an effective wind speed of each wind power installation at least for each of the wind power installations without freely inflowing wind from the average wind speed and wind direction taking into account the shading matrix for an unthrottled wind farm, ascertaining an available power of each of the wind power installations on the basis of their power curve and the ascertained effective wind speed, and ascertaining the available power of the wind farm by summing the available powers of each of the wind power installations.

This method is based on the concept of averaging the wind speed and wind direction of the wind power installations with freely inflowing wind. Here and within the scope of the entire application, the word "average" is not restricted to an arithmetic average value and other forms of average values can be used as it were. The wind power installations with freely inflowing wind are those installations for which the wind striking the wind power installations with freely inflowing wind is not influenced by other wind power installations or other obstacles, for example buildings, elevations, etc., for a particular wind direction. According to this method, the effective wind speed is ascertained for each wind power installation taking into account the shading matrix for the averaged value of the wind speed and direction. This method makes it possible to estimate the available power in a particularly simple and suitable manner since the shading matrix is examined for only one value of the wind speed and wind direction, which is the same for all of the wind power installations. However, the method presupposes the presence of installations with freely inflowing wind, which is not always the case depending on the wind direction, for example. In particular, wind farms in the vicinity or else geographical conditions can ensure that there are no wind power installations with freely inflowing wind.

The effective wind speed of the wind power installations with freely inflowing wind can likewise be determined taking the shading matrix into account. This procedure is appropriate, in particular, if there is fixed known shading, for example caused by terrain influences or buildings. Alternatively, the ascertained wind speed of the associated wind power installation with freely inflowing wind can also be directly set as the effective wind speed.

According to a second method b), the method for determining the available power comprises the following steps:
 determining the wind power installations with freely inflowing wind for a particular wind direction,
 determining a wind speed and wind direction of all of the wind power installations with freely inflowing wind,
 ascertaining effective wind speeds of at least each of the wind power installations without freely inflowing wind taking into account the shading matrix for an unthrottled wind farm for each of the determined wind speeds and wind directions of the wind power installations with freely inflowing wind,
 ascertaining an installation-specific average effective wind speed, for at least each of the wind power installations without freely inflowing wind, as an average value of the effective wind speeds ascertained for each wind power installation with freely inflowing wind,
 ascertaining an available power of each of the wind power installations on the basis of their power curve and the average effective wind speed ascertained in an installation-specific manner, and
 ascertaining the available power of the wind farm by summing the available powers of each wind power installation.

In other words, effective wind speeds of each installation are therefore ascertained by means of the determined wind speed and wind direction of each of the wind power installations with freely inflowing wind taking into account the shading matrix for an unthrottled wind farm. In contrast to the first method, shading matrices are evaluated repeatedly, namely according to the number of wind power installations with freely inflowing wind, for each of the wind power installations according to the second method in order to determine a plurality of effective wind speeds for each wind power installation, namely the wind speeds of each of the wind power installations with freely inflowing wind. The averaging over the wind power installations with freely inflowing wind which is virtually obtained as a result is therefore carried out according to this method only after taking into account the shading effects which are taken into account for each wind power installation independently for each of the wind speeds of the wind power installations with freely inflowing wind. According to the first method, the averaging is already carried out before taking the shading effects into account; specifically, the shading effects are taken into account for each wind power installation for an already averaged wind speed of the wind power installations with freely inflowing wind. The second method also requires the presence of installations with freely inflowing wind.

Like in connection with the first method, the ascertained wind speeds can be directly set as the effective wind speed for any desired number of the wind power installations with freely inflowing wind, including all wind power installations and no wind power installations. In the same manner, the shading matrix may also be advantageous for the wind power installations with freely inflowing wind, for example if known shading is present.

According to a third method c), the method for determining the available power comprises the following steps:
 ascertaining individual wind speeds and wind directions of the wind power installations,
 calculating modeled wind speeds and wind directions on the basis of a set farm-effective wind speed and wind direction taking into account the shading matrix and the wind farm throttling,
 optimizing the set farm-effective wind speed and wind direction on the basis of a comparison of the individual wind speeds and wind directions and the modeled wind speeds and wind directions,
 ascertaining the effective wind speed of each wind power installation from the optimized farm-effective wind speed and wind direction taking into account the shading matrix for an unthrottled wind farm, and
 ascertaining an available power of each of the wind power installations on the basis of their power curve and the ascertained effective wind speed, and
 ascertaining the available power of the wind farm by summing the available powers of each of the wind power installations.

The third method can be summarized under the term of optimum correlation of the wind speed and direction for all installations. In comparison with the first and second methods, the third method does not require any wind power installations with freely inflowing wind, but rather wind speeds and wind directions of all of the wind power installations are ascertained. A set farm-effective wind speed and wind direction are optimized to the effect that the effective wind speeds of each wind power installation which can be determined using the shading matrix come as close as possible to the individual wind speeds and wind directions. In this case, the set farm-effective wind speed is the assumed optimum value, on the basis of which the available power in the unthrottled case can then be determined. The third method is suitable, in particular, when there are no installations with freely inflowing wind in the wind farm.

According to a fourth method d), the method for determining the available power comprises the following steps:
 ascertaining individual wind speeds and wind directions of the wind power installations,
 inverting the shading matrix for each of the wind power installations in order to estimate a steady farm-effective wind speed and wind direction on the basis of the individual wind speed and wind direction of the respective wind power installation and the wind farm throttling,
 averaging all estimated farm-effective wind speeds and wind directions,
 ascertaining the effective wind speed of each wind power installation from the averaged farm-effective wind speed and wind direction taking into account the shading matrix for an unthrottled wind farm, and
 ascertaining an available power of each of the wind power installations on the basis of their power curve and the ascertained effective wind speed, and ascertaining the available power of the wind farm by summing the available powers of each of the wind power installations.

The fourth method is based on the fact that the shading matrix is inverted in a manner specific to the wind power installation in order to obtain an estimated farm-effective wind for an individual wind belonging to each of the wind power installations. These farm-effective winds obtained from each installation are averaged and are used to estimate the effective wind speed of each wind power installation from the shading matrix taking the unthrottled power into account. The fourth method also does not require any wind power installations with freely inflowing wind and can be used, for example, as an alternative to the third method or else to one of the other methods. In contrast to the third method, the ascertainment according to the fourth method is carried out on the basis of an inversion of the shading matrix instead of an optimization of a farm-effective wind speed which has been set.

According to a fifth method e), the method for determining the available power comprises the following steps:
  determining a wind speed and wind direction for each of the wind power installations,
  inverting the shading matrix for each of the wind power installations in order to estimate a steady farm-effective wind speed and wind direction on the basis of the individual wind speed and wind direction of the respective wind power installation and the wind farm throttling,
  ascertaining the effective wind speed of each wind power installation from the respectively estimated steady farm-effective wind speed and wind direction taking into account the shading matrix for an unthrottled wind farm, and
  ascertaining an available power of each of the wind power installations on the basis of their power curve and the respective ascertained effective wind speed, and
  ascertaining the available power of the wind farm by summing the available powers of each of the wind power installations.

In summary, according to the fifth method e), each installation determines its share of the farm power on the basis of its current power and its available power and the wind-direction-dependent aerodynamic farm efficiency valid for said installation. For this purpose, the shading matrix is individually inverted for each of the wind power installations on the basis of the throttling and a steady, farm-effective wind speed and wind direction are estimated. This estimated farm-effective wind speed is determined for each installation independently and is calculated back again to the fictitious wind speed of the respective installation which is effective in the unthrottled case with the aid of the non-inverted unthrottled shading matrix and the available power is then inferred using the power curve. Since no information is required from further wind power installations in the wind farm until determining the available power of each of the wind power installations, these steps according to the fifth method e) can also be implemented in the wind power installation itself. A farm computer must then only sum the power reports from the individual wind power installations in this case. Alternatively, the method according to the fifth method e) can naturally also be implemented partially or completely on a farm computer.

As a possible embodiment, individual steps of the method e) can also be combined, thus making it possible to dispense with individual intermediate variables cited above:

One possible variant involves combining the inverse matrix, which is interpolated on the basis of the throttled power, and the shading matrix of the unthrottled, maximum technically possible supply as the aerodynamic efficiency, such that the intermediate step relating to the wind speed and direction valid throughout the farm can be dispensed with on the installation or the farm computer and is required only in advance for the calculation of the matrices. In other words, according to this variant, the shading matrix and/or the inverse shading matrix need not be explicitly expressed and stored on the basis of the wind speed, but rather implicitly according to the generalization using the aerodynamic efficiency. This can computationally simplify the determination of the available power of the wind farm in situations in which the wind speed valid throughout the farm is not required.

A second possible variant involves also integrating the ascertainment of the available powers of the individual wind power installations on the basis of the power curve into the matrix system and/or integrating the determination of the available power of the individual installation into the computing step. This produces a subsystem which comprises the current working point (preferably comprising the rotational speed, pitch angle, aerodynamic torque and/or power production and the power limitation $P_{gedr}$) or the wind speed estimated from these variables as the input variable and which calculates the effective wind speed reduced by shading effects and the associated available power.

One possible way of determining the wind speed and wind direction is by measuring the wind speed using an anemometer typically installed on the nacelle of a wind power installation. However, such a measurement, although it can be carried out very accurately using modern ultrasonic anemometers, can be used only to a limited extent for said application. On the one hand, the anemometer measures the wind speed only in the center of the plane defined by the rotor blades. The wind speeds at the blade tips, which are 50 meters or more away from the nacelle in current wind power installations, cannot be directly measured. In addition, the measurement can be influenced by turbulence and shading as a result of the position of the anemometer behind the rotor blades. In addition, the measured wind speed is influenced by taking energy from the wind field, also on the basis of the power throttling.

In one embodiment, the method according to the invention also comprises:
  determining a wind speed and wind direction, which act on average on the rotor of a wind power installation, on the basis of a working point of the wind power installation for at least one of the wind power installations.

A possible way of determining the wind speed and wind direction of an undisrupted wind speed prevailing at a wind power installation, which is preferred over the nacelle anemometer, is based on a wind estimator which is based on the installation working point. The estimation is referred to as undisrupted since no disruption as a result of removing energy by means of the rotor or effects of a measuring arrangement behind the rotor, like for example in the case of the nacelle anemometer, distort the wind speed. However, the term "undisrupted" relates to the determination of the wind speed itself and does not include any wake effects which are caused by other wind power installations in the farm.

The installation working point preferably comprises a torque, a rotational speed and a collective pitch angle of the wind power installation. The undisrupted wind speed which acts on average on the entire rotor is ascertained on the basis of this working point. A power coefficient, called $C_P$ coefficient, is preferably used for this purpose and indicates a relationship between the wind blowing through the rotor surface and an aerodynamic power of the wind power installation. The $C_P$ coefficient preferably depends on the pitch angle and a tip-speed ratio $\lambda$. The relationship preferably depends on the rotor surface crossed, the rotor and the wind speed and can be indicated, for example, by means of the following formula:

$$P_{Aero} = \frac{1}{2}\rho\pi r_{Rotor}^2 v_{Wind}^3 C_P\left(\lambda = \frac{r_{Rotor} \cdot \frac{2\pi}{60 \text{ s/min}} \cdot n_{Rotor}}{v_{Wind}}, \alpha\right)$$

The tip-speed ratio is calculated from the ratio of the speed of the rotor blade tip to the prevailing wind speed. The speed of the rotor blade tip can be calculated from the radius of the rotor ($r_{Rotor}$) and a rotational speed of the rotor ($n_{Rotor}$). $\alpha$ denotes a collective pitch angle of the rotor blades. ($P_{Aero}$) is the aerodynamic power generated by the wind power installation, $\rho$ denotes the air density.

In one embodiment, the wind speed acting on average on the rotor of the wind power installation is determined by means of at least one of the following methods:
  interpolation from at least three-dimensional tables of the wind speed as a function of a rotational speed, an aerodynamic power and a pitch angle,
  iteration based on a family of characteristics as a function of a tip-speed ratio and a pitch angle.

A direct resolution of the power balance, for example according to the above formula, according to the wind speed is not possible since both the tip-speed ratio and the aerodynamic power itself each depend on the wind speed. According to this embodiment, methods which can be used to determine the wind speed acting on the rotor are therefore proposed. At least three-dimensional tables of the wind speed as a function of a rotational speed ($n_{Rotor}$), the aerodynamic power ($P_{Aero}$) and the pitch angle ($\alpha$) can be represented, for example, with the following equation:

$$v_{Wind} = fkt(n_{Rotor}, P_{Aero}, \alpha)$$

An interpretation of this is carried out with little computational effort and the storage of the three-dimensional tables requires different volumes of data, depending on the resolution.

Additionally or alternatively, the wind speed can be iteratively determined from the $C_P$ family of characteristics, for example according to Newton's method or another iteration method.

In one embodiment, it is possible to change between the first method, which is based on the anemometer wind speed measurement, and the second method, which is based on the working point of the wind power installation, depending on the curtailment, the tip-speed ratio and/or the pitch angle. In the case of severe curtailment, low tip-speed ratios and large pitch angles in particular, the method based on the family of characteristics becomes more uncertain and can be advantageously replaced with the wind speed measurement in these ranges.

In one embodiment, the method also comprises correcting the wind speed and wind direction, in particular an averaged wind speed and wind direction, and/or the available power for at least one of the wind power installations on the basis of spreading of the wind field through the farm.

With respect to the described first method a) and second method b), in particular, in which only the prevailing wind at the installations with freely inflowing wind is taken into account, it should be noted that the wind which is captured by the installations with freely inflowing wind regularly does not correspond to the wind captured by installations further back in the inflow direction, even without taking into account wake effects. Changes in the wind continue with a time delay through the entire farm, starting with the installations with freely inflowing wind. In other words, the installations in the wake of the installations with freely inflowing wind "feel" the wind of the installations with freely inflowing wind with a time delay. Spreading of the available power, the effective wind speed and/or the wind direction is preferably taken into account for the correction.

In one embodiment, the correction is carried out in the form of a weighted sliding average value. The influence of older wind values therefore preferably disappears over time, as a result of which the finite extent of the wind farm and therefore the situation in which the change in the wind has continued throughout the entire farm are taken into account.

In one embodiment, the sliding average value is adapted on the basis of a flow time, in particular an average of the wind speed. This preferably makes it possible to take into account the fact that changes in the wind have a greater influence on the average value of the wind prevailing in the farm, the higher the wind speed or the shorter the flow time through the wind farm, since the change spreads more quickly throughout the entire farm. Alternatively or additionally, the sliding average value can be adapted on the basis of the absolute wind direction, for example if the path to the complete spreading of a change is not the same over all wind directions, as is generally the case.

In one embodiment, the method implements at least two of the methods a) to e) and a comparison test between the at least two methods is enabled and/or one of the implemented methods is selected on the basis of a parameter. For example, one of the first method a) and the second method b) can be used whenever a sufficient number of installations with freely inflowing wind can be found for a particular wind. If, in contrast, no installation with freely inflowing wind can be found, for example on account of a terrain structure or an adjacent wind farm, the method can change to one of the third method c) to fifth method e).

In one embodiment, the shading matrix is stored for each wind power installation as a table on the basis of the farm-effective wind speed and direction and a maximum farm power.

The shading matrix provides the effective wind speed of each of the wind power installations using a farm wake model. The wake effects must take into account throttled wind farms, which is why the shading matrix is preferably stored on the basis of the maximum farm power or the maximum installation power. The maximum farm power should be understood here as meaning the power value which must not be exceeded as a result of, for example, technically dictated restrictions, for example for reasons of sound protection. The maximum farm power is therefore a value which is possibly reduced in comparison with the value of a nominal power. The number of supporting points of the calculation is preferably adapted to conditions; for example, a high resolution of the wind direction is decisive in the case of a strict matrix arrangement. The number of supporting points of the maximum farm power or the wind farm throttling can be selected according to a sensitivity of the calculation, for example.

The shading matrix therefore preferably makes it possible to obtain at least one effective wind speed of each wind power installation on the basis of a wind speed, a wind direction and wind farm throttling as input parameters. The shading matrix is not restricted to these input and output parameters; alternatively or additionally, other variables, preferably measurement variables, can be incorporated as input and output parameters. For example, a working point and/or an installation power can take the place of the wind speeds, in particular as an input variable.

The shading matrix is preferably determined, as an alternative or in addition to the maximum farm power, on the basis of a maximum installation power of each wind power installation. Throttling of the wind farm can be represented in a more precise manner by individualizing the wind farm throttling to the individual installations.

In one embodiment, the farm wake model is adaptive; in particular, a self-learning method for adapting to changes in the environment and/or for correcting errors in the farm wake model is implemented.

It is known practice to use steady wake models in the site assessment of wind farms for the purpose of predicting the yield and determining the turbulence and shearing. Steady wake models comprise, for example, the Ainslie, Jensen or Frandsen wake model; CFD simulations are also used for complex terrain. The calculation of the farm wake model is dependent on the arrangement of the wind power installations in the farm and on geographical conditions. The wake effects are indicated, in particular, on the basis of the wind speed and the wind direction.

By virtue of the farm wake model being carried out in an adaptive manner, errors and inaccuracies which are possibly present in the model used can be advantageously corrected by adapting the model. For example, this makes it possible to appropriately react to wind power installations which have been newly erected in the environment of the wind farm or to a change in the geographical structure as a result of building construction and/or deforestation. The adaptation can be advantageously implemented using all known self-learning methods.

In one embodiment, different shading matrices are provided on the basis of different farm wake models, wherein one of the shading matrices is selected on the basis of a parameter, in particular a parameter indicative of atmospheric stability, or is interpolated between the tables.

The parameter indicative of atmospheric stability can be extracted, for example, from a weather forecast or can be determined in another manner by means of suitable measuring instruments in the environment of the wind farm. The parameter preferably comprises a temperature gradient over the elevation, which differs considerably in the case of stable air stratification from that in the case of unstable air stratification, or a measured or predicted turbulence intensity or the turbulent kinetic energy. Alternatively or additionally, it is possible to distinguish between day and night since it is known that air stratification at night is more stable than during the day. In one example, two different shading matrices can be provided and, in further examples, three or more different shading matrices can also be provided on the basis of different parameters indicative of atmospheric stability.

In one embodiment, the different farm wake models are based on different wake decay constants in each case. The wake decay constant indicates how greatly the wind speed decreases in the wake of the wind power installation and how quickly the turbulence generated by a wind power installation is canceled following the wind power installation. This cancellation is dependent on meteorological parameters such as the atmospheric stability, for example.

In one embodiment, the method comprises low-pass filtering for correcting errors, in particular in the estimated available power. High-frequency, short-term changes based, for example, on errors or transient responses are disregarded by means of the low-pass filtering and do not result in an impairment in the estimation.

In one embodiment, the available power of the wind farm is provided substantially in real time. By virtue of the signal being provided substantially in real time, the requirements of network operators, in particular for compensation payments in the event of network overloading, and from the installation control, in particular for positive balancing power provision or for negative balancing power provision, for example, can be complied with. The requirements for "substantially" in real time are imposed by the application and the solution according to the invention enables compliance by virtue of the fact that no time-consuming simulations and complicated calculations at the run time are needed to provide the available power of the wind farm or variables which allow only retrospective calculations are used.

In one embodiment, the air density, for example determined by the air pressure and/or the temperature, is taken into account when ascertaining the available power of one of the wind power installations. The available power can be determined more precisely by taking the air density into account.

In one embodiment, an effective wind direction of each wind power installation is ascertained taking into account an extended shading matrix. In addition to the wind speed, the effective wind direction is therefore also obtained in this embodiment on the basis of the shading matrix which can be advantageously used for further evaluations since the wind direction of the individual installations can differ considerably from one another, in particular in complex terrain. Alternatively or additionally, a power and/or an undisrupted wind speed of each wind power installation, which is important upon reaching the maximum power in particular, can be inferred in further embodiments by means of the shading matrix.

In one embodiment, the losses of a network of the wind farm are taken into account. This results in a more accurate ascertainment of the power available in the farm.

In one embodiment, further limitations of the wind power installations in the wind farm, in particular limitations which are not due to the network or balancing power, are taken into account, including those for technical reasons, maintenance, reduced-sound operation and/or shadowing.

Provided is a wind farm having a plurality of wind power installations, wherein the wind farm has a controller. The controller is set up to carry out the method according to the invention.

Provided is a wind power installation in a wind farm, wherein the wind power installation has a controller, wherein the controller is designed to ascertain an available power according to one or more methods.

BRIEF DESCRIPTION OF THE SEVERAL
VIEWS OF THE DRAWINGS

Further configurations and advantages are described below with reference to the accompanying figures.

Figure 2:
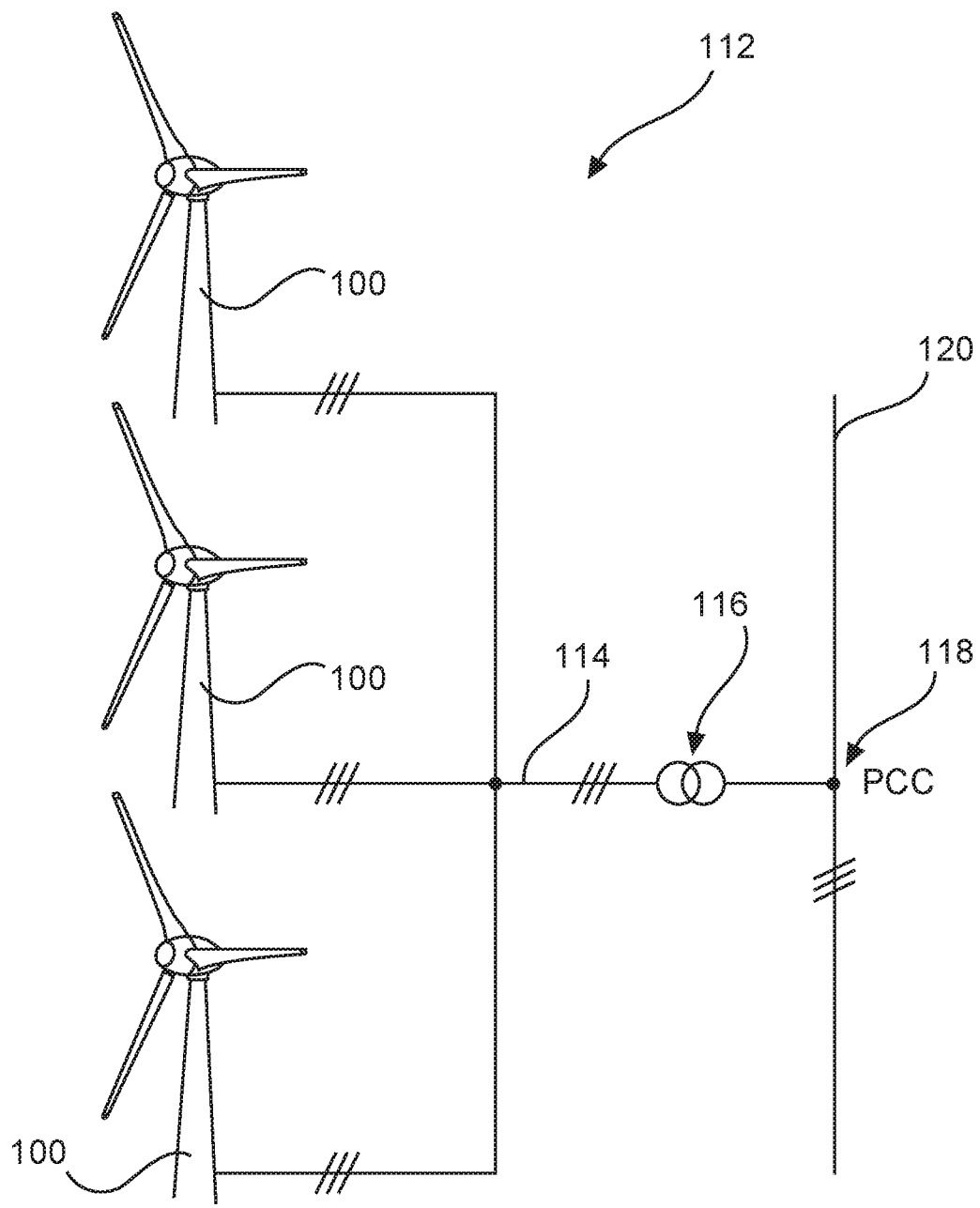
Figure 3:
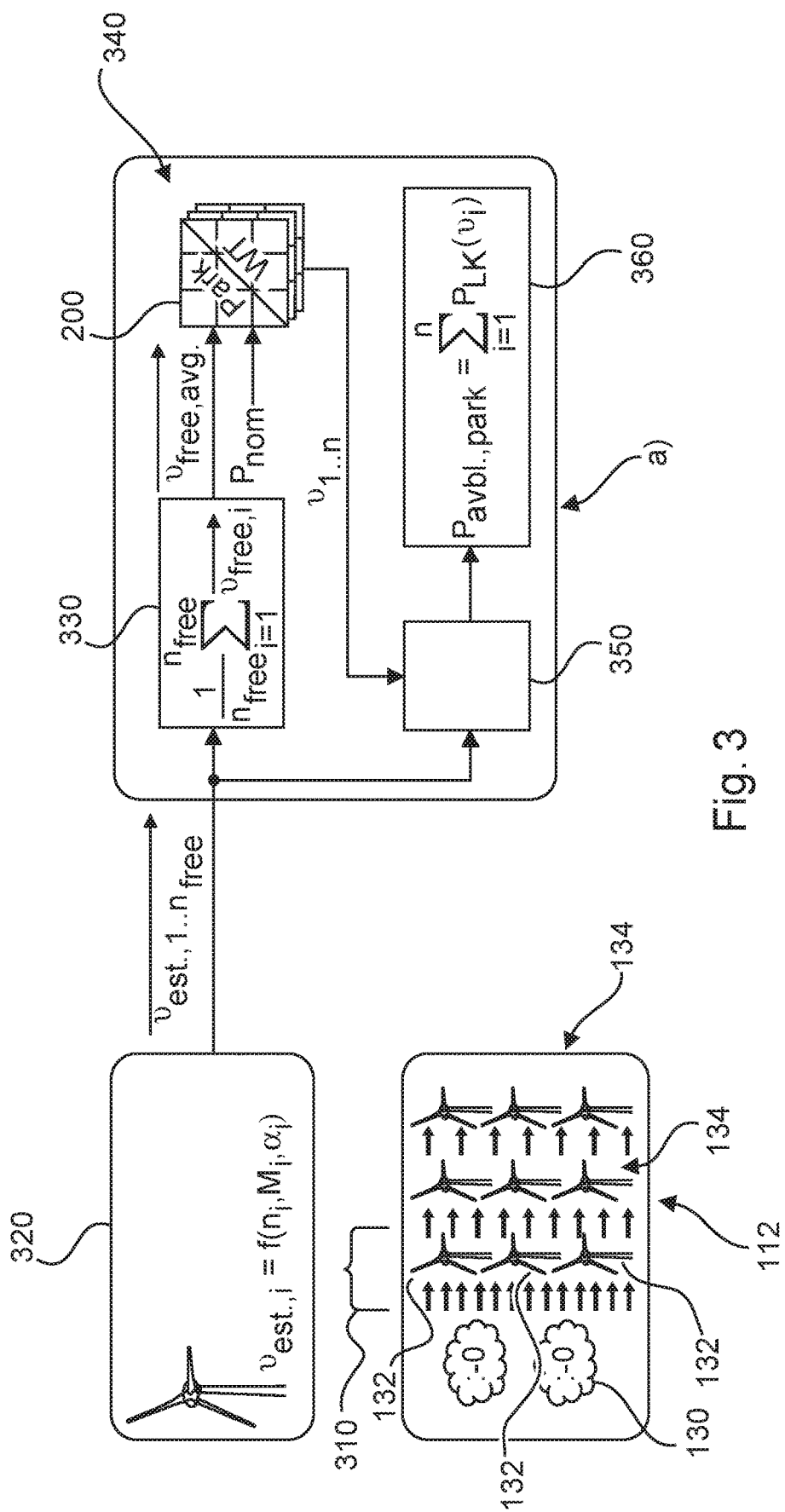
Figure 4:
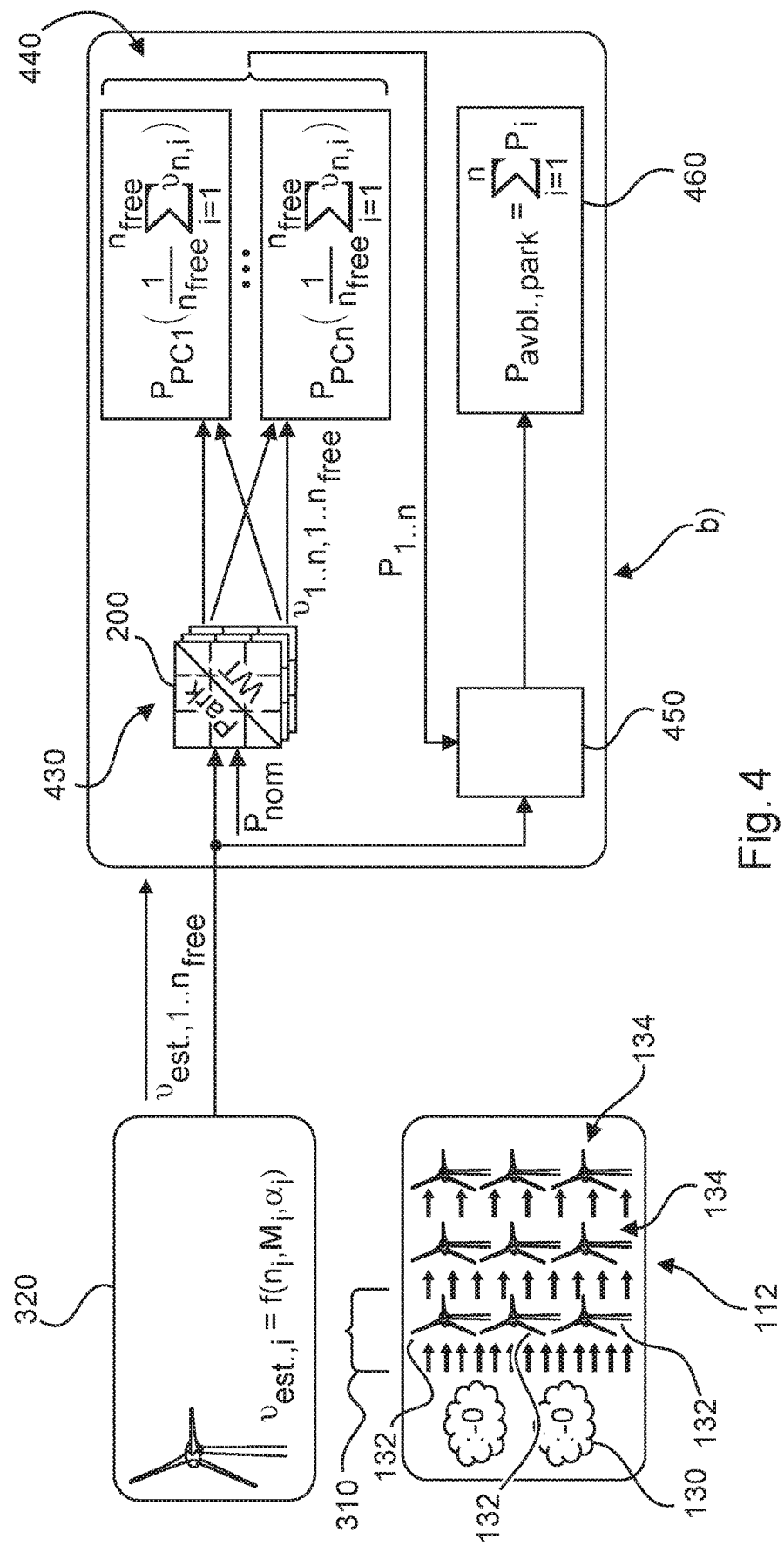
Figure 5:
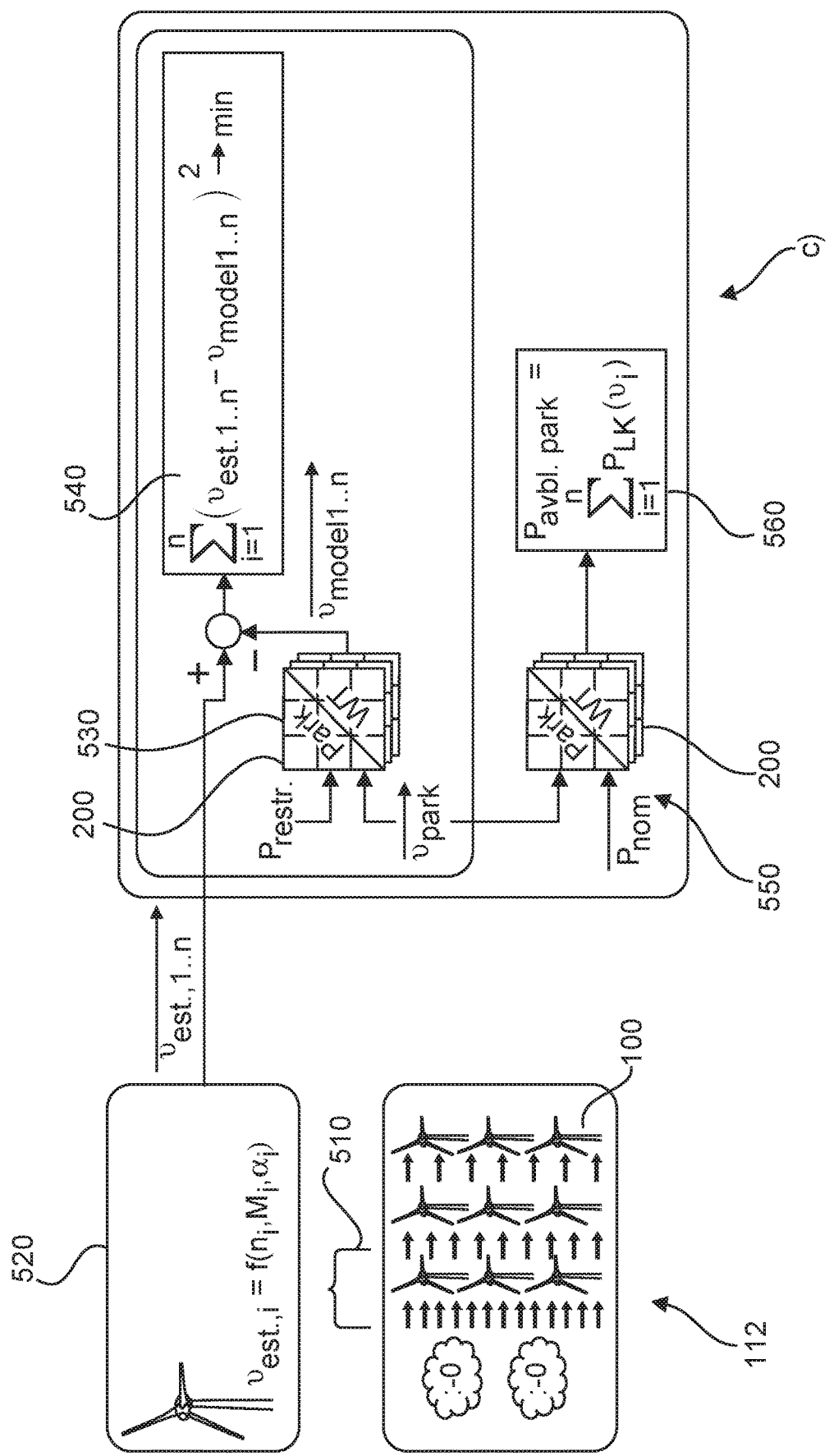
Figure 6:
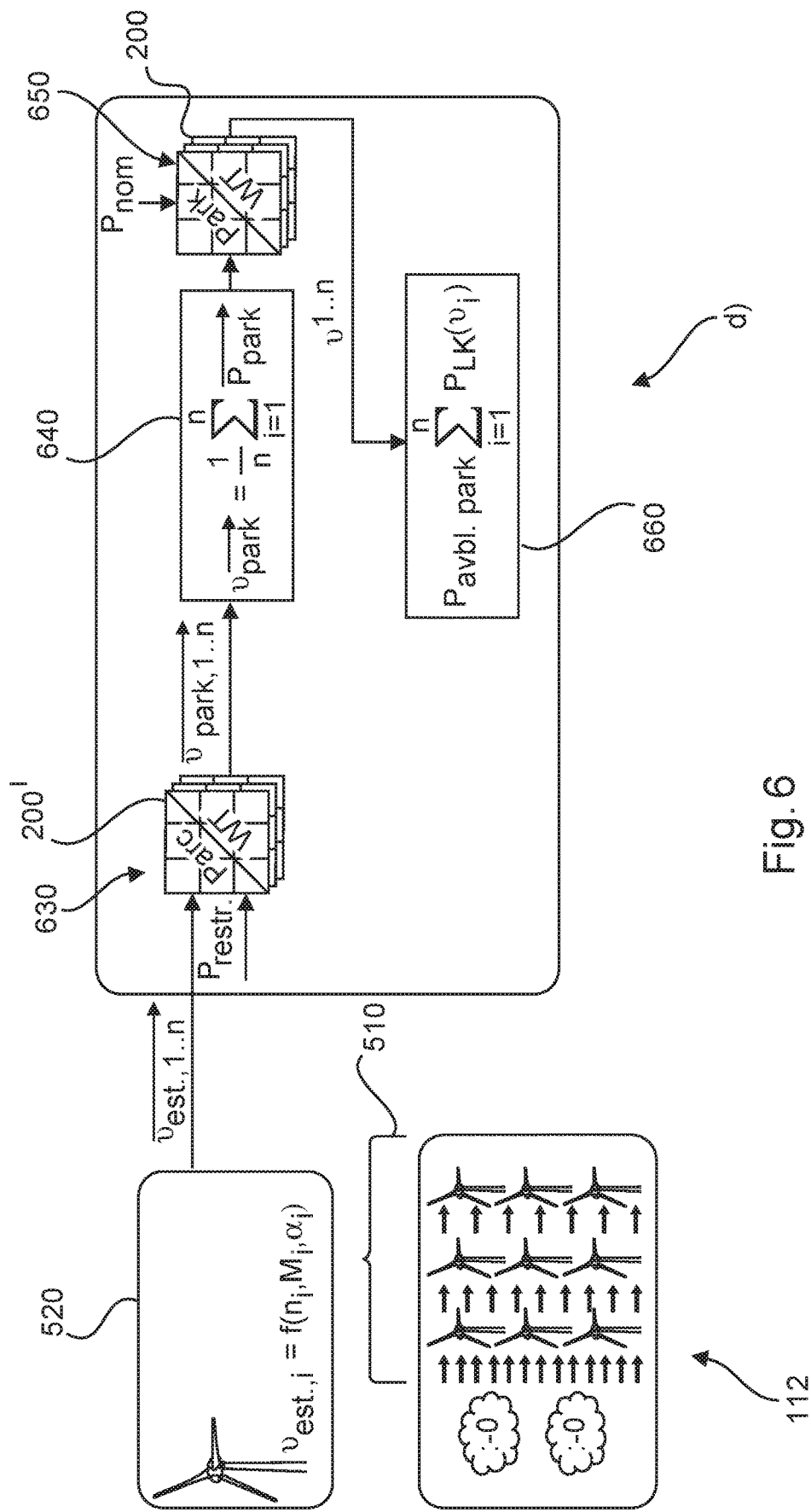
Figure 7:
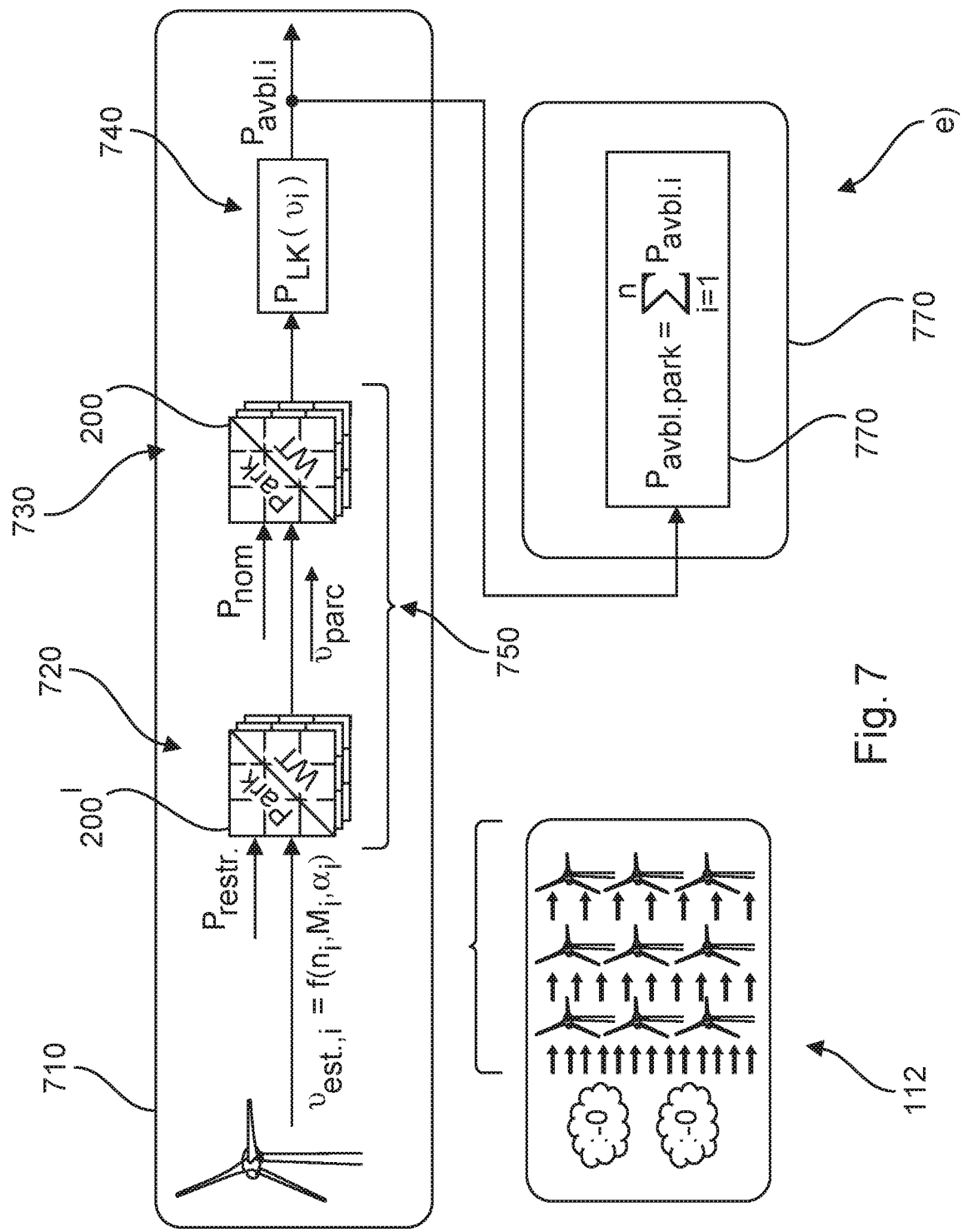
Figure 8:
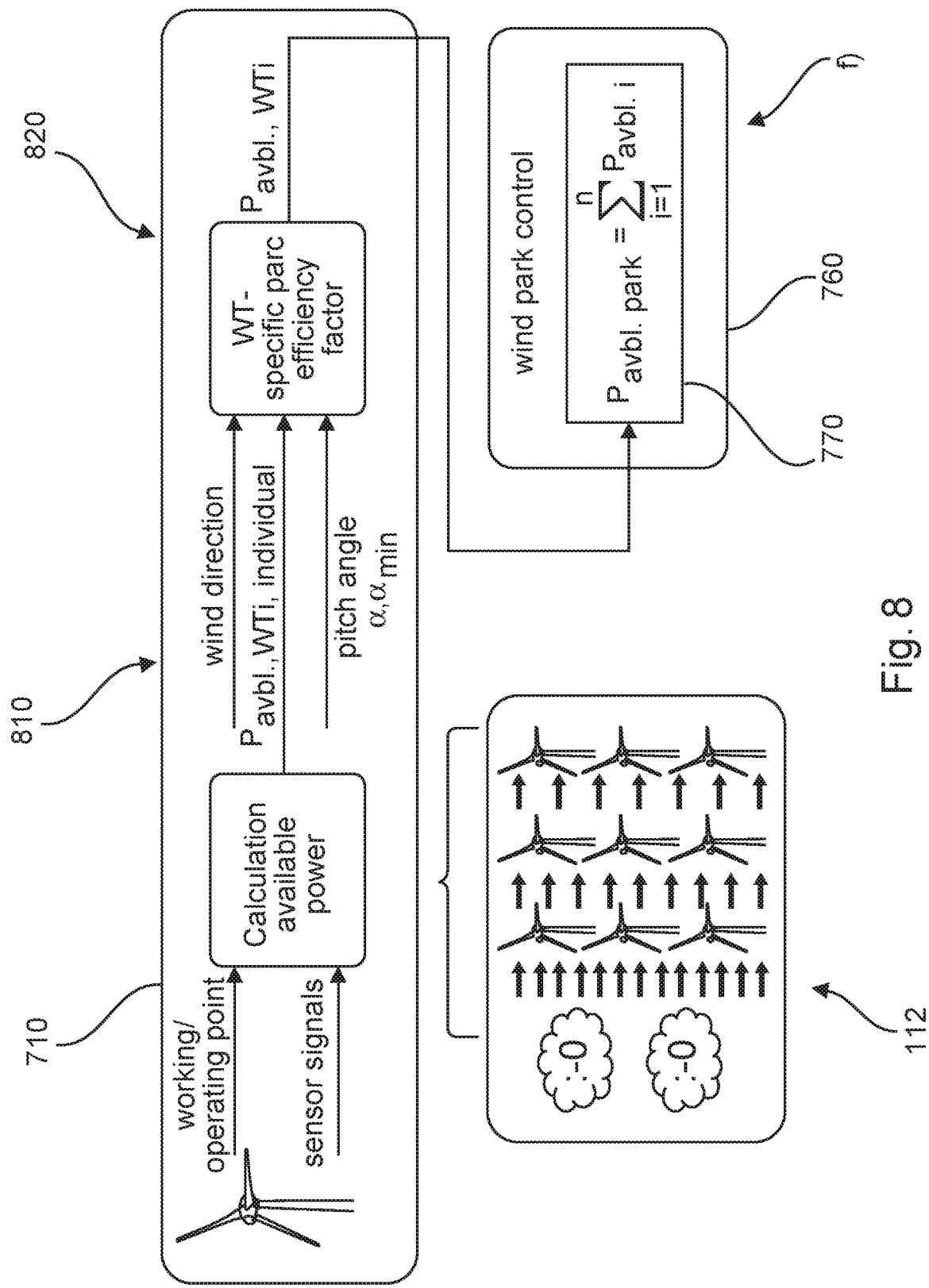
Figure 9:
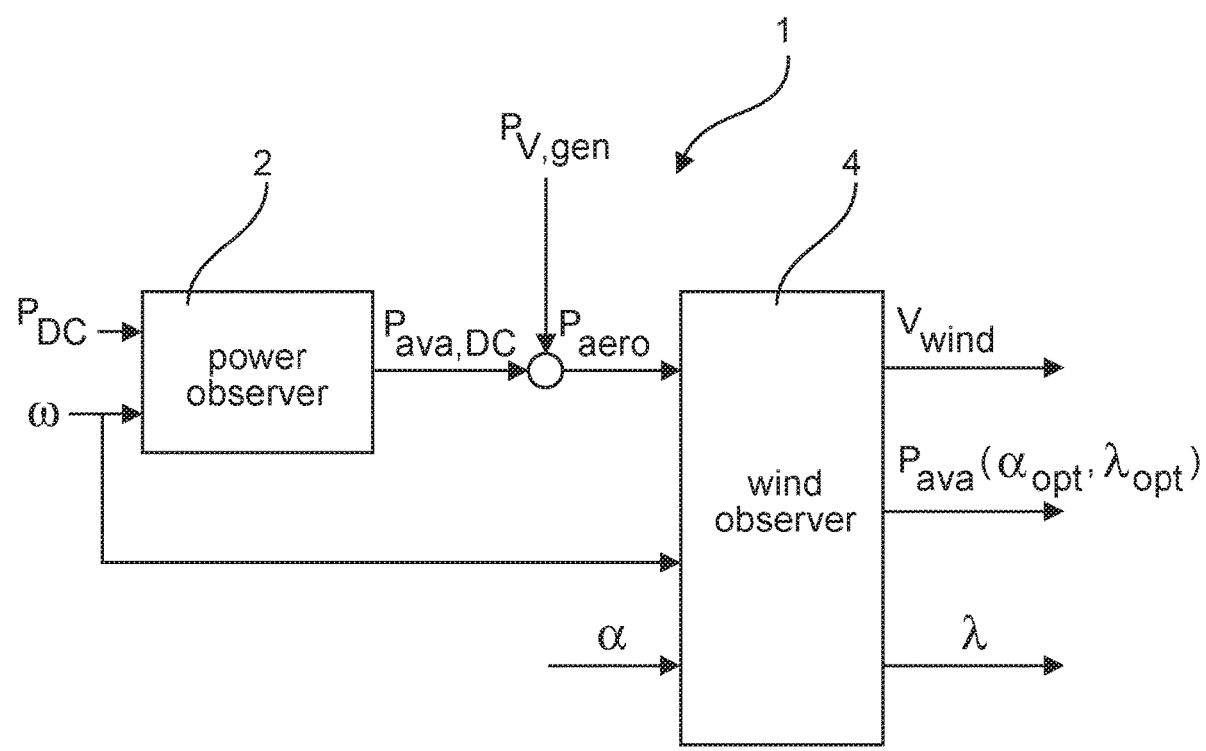

FIG. 1 schematically shows a wind power installation,
FIG. 2 schematically shows a wind farm,
FIG. 3 schematically shows a first method for determining an available power of a wind farm,
FIG. 4 schematically shows a second method for determining an available power of a wind farm, FIG. 5 schematically shows a third method for determining an available power of a wind farm, FIG. 6 schematically shows a fourth method for determining an available power of a wind farm, FIG. 7 schematically shows a fifth method for determining an available power of a wind farm, FIG. 8 schematically shows a sixth method for determining an available power of a wind farm, and FIG. 9 shows a block diagram for explaining the algorithm on which the determination of the equivalent wind speed is based.

DETAILED DESCRIPTION

FIG. 1 shows a schematic illustration of a wind power installation 100. The wind power installation 100 has a tower 102 and a nacelle 104 on the tower 102. An aerodynamic rotor 106 having three rotor blades 108 and a spinner 110 is provided on the nacelle 104. The aerodynamic rotor 106 is caused to rotate by the wind during operation of the wind power installation and therefore also rotates an electrodynamic rotor of a generator which is directly coupled to the aerodynamic rotor 106. The electrical generator is arranged in the nacelle 104 and generates electrical energy.

FIG. 2 shows a wind farm 112 having, by way of example, three wind power installations 100 which may be identical or different. The three wind power installations 100 are therefore representative of fundamentally any desired number of wind power installations in a wind farm 112. The wind power installations 100 provide their power, namely the generated current in particular, via an electrical farm network 114. In this case, the currents or powers respectively generated by the individual wind power installations 100 are added, and a transformer 116 is usually provided and steps up the voltage in the farm in order to then feed it into the supply network 120 at the feed-in point 118 which is also generally referred to as the PCC. FIG. 2 is only a simplified illustration of a wind farm 112 which does not show a controller, for example, even though a controller is naturally present. The farm network 114 may also be configured differently, for example, by virtue of a transformer also being present at the output of each wind power installation 100, for example, to name just one other exemplary embodiment.

The wind farm 112 can be operated with reduced power, for example in the event of a network-related power reduction. In this case, one or more or all of the wind power installations 100 operate(s) with a power which is below the power possible for the wind situation. In order to provide a $P_{available}$ signal, wind power installations must also be able to ascertain their available power during such reduced-power operation. As mentioned, wind power installations 100 in the wake see a higher wind speed during the power reduction than in the non-reduced case, which results in an overestimation of the available farm power. The aim of the method for determining an available power of a wind farm 112 is therefore to obtain the available power of a wind farm, as the sum of the powers of the wind power installations, taking into account the farm effect, on the basis of, for example, a shearing force, a terrain model and a farm plan for the given throttled farm power, wind speed and wind direction.

This consideration is effected, as described with reference to the subsequent figures, using a shading matrix 200 which determines at least one effective wind speed of each of the wind power installations 100 in the wind farm 112 as a function of at least one wind speed and wind direction and wind farm throttling using a farm wake model. Various methods for implementing the shading matrix 200 are described in detail below with reference to FIGS. 3 to 8.

FIG. 3 schematically shows a first method a) for determining the available power of the wind farm 112 using the shading matrix 200. The borders with rounded corners in the figures schematically combine a hierarchical or structural responsibility of the wind farm, individual installation controller and farm controller or farm computer relating to individual method steps or calculations.

The wind farm 112 shown in FIG. 3 and also in the subsequent FIGS. 4 to 8 comprises nine wind power installations 100 which are arranged in a strict matrix arrangement. It goes without saying that this is only a very simple example of an actual wind farm 112 and the teaching can likewise be applied to any desired wind farms. The wind farm 112 symbolically has inflowing wind 130 from the left, with the result that three wind power installations 132 have freely inflowing wind. The further wind power installations 134 are in the wake of the wind power installations 132 with freely inflowing wind and experience a reduced wind speed.

In a first step 310, the installations 132 with freely inflowing wind are selected or determined from the wind power installations 100. The determination in step 310 is carried out on the basis of the wind direction.

In step 320, an undisrupted wind speed and wind direction of the wind power installations 132 with freely inflowing wind are then determined. The undisrupted wind speed and wind direction correspond to the wind speed which is not influenced by the rotor. It is preferably ascertained using the wind estimator which is described in detail with reference to FIG. 9. Alternatively, the undisrupted wind speed can also be determined by means of anemometers and the like fitted to the wind power installation with suitable corrections.

The ascertained undisrupted wind speeds and wind directions $\overrightarrow{v}_{Schätz,1..n_{frei}}$ are averaged in a step 330 in order to obtain an average wind speed and wind direction $\overrightarrow{v}_{frei,Mittel}$. In FIG. 3, the wind speed and wind direction are represented as a wind vector, for example. The average value is represented as the sum of the wind vectors divided by the number $n_{frei}$ of wind power installations 132 with freely inflowing wind. It should be noted that this formation of an average value is only one example and other functions can also be used in a similar manner to form the average value. Together with the average wind speed and wind direction $\overrightarrow{v}_{frei,Mittel}$, a power during the non-limited operation of the wind farm $P_{nom}$, is used in a step 340 to obtain effective wind speeds $v_{1...n}$ of each wind power installation taking into account the shading matrix 200. Non-limited operation is present if the wind farm is operated with the permitted maximum power and not with a lower, throttled power $P_{gedr}$, for example on account of network requirements.

As an alternative to all wind power installations, the wind power installations 132 with freely inflowing wind can be completely or partially excluded from step 340 and the available power of the wind power installations 132 with freely inflowing wind can be ascertained directly on the basis of the power curve for the wind speed determined in step 320, that is to say the wind speed determined in step 320 corresponds to the effective wind speed for the wind power installations with freely inflowing wind in this embodiment.

In a step 350, the effective wind speed $v_{1...n}$ of each wind power installation is corrected on account of spreading of the wind field through the farm. A flow time through the farm is determined, for example, as the quotient of the extent of the wind farm 112 in the inflow direction to the wind speed, for example the estimated wind speed. Other possibilities for correction in step 350 are also possible. The correction in step 350 corresponds to a farm-layout-dependent flow delay through the wind farm.

The corrected effective wind speeds are then transformed in step 360 into installation-dependent power values on the basis of the power curves $P_{LK}$, are summed and are transferred to a farm-available power $P_{verfg,Park}$.

FIG. 4 schematically shows a second method b) for determining an available power of a wind farm 112. Like in the first method a), the wind power installations 132 with freely inflowing wind are first of all determined according to the second method b) in step 310 and their wind speed and wind direction are determined in step 320.

An effective wind speed $v_{1 \ldots n, 1 \ldots n_{frei}}$ is determined for each of the determined wind speeds and wind directions of the wind power installations with freely inflowing wind in step 430 for each wind power installation 100 using a shading matrix 200 for an unthrottled wind farm. Therefore, for each of the n wind power installations 100 in the wind farm 112 of the number of wind power installations with freely inflowing wind $n_{frei}$, effective wind speeds $v_{i,1 \ldots n_{frei}}$ are accordingly determined in step 430.

For each of the wind power installations, an average value of the effective wind speeds for this wind power installation is then determined in step 440 and the available power of each of the wind power installations is ascertained on the basis of their power curve for the average effective wind speed ascertained in an installation-specific manner.

In an alternative embodiment, the wind power installations 132 with freely inflowing wind can be completely or partially excluded from steps 430 and 440 and the available power of the wind power installations 132 with freely inflowing wind can be directly determined on the basis of the power curve for the wind speed determined in step 320.

The ascertained available powers $P_{1 \ldots n}$ are corrected in a step 450, which corresponds to a farm-layout-dependent flow delay through the wind farm, as in step 350. The difference is only that, in the second method b), the available powers $P_{1 \ldots n}$ are corrected instead of the ascertained effective wind speeds $v_{1 \ldots n}$.

Finally, the available powers are summed in step 460 in order to obtain the available power of the wind farm 112.

FIG. 5 schematically shows a third method c) for determining an available power of a wind farm 112. In contrast to the first method a) and the second method b), all wind power installations 100 in the wind farm 112 are selected in the third method c) in step 510 and their wind speed and wind direction are determined in step 520. The method for ascertaining the undisrupted wind speeds and wind directions $v_{Schätz,1 \ldots n}$ and step 520 can correspond to the method in step 320, that is to say can be carried out, for example, with the aid of the wind estimator which is described with reference to FIG. 9.

The third method c) is an iteration method which is aimed at optimally correlating the wind speed and direction for all wind power installations. For this purpose, an effective farm wind speed $\vec{v}_{Park}$ is set and model speeds of each wind power installation $\vec{v}_{Modell,1 \ldots n}$ are determined in step 530 for a throttled power $P_{gedr}$ on the basis of the shading matrix 200. The modeled wind speeds and wind directions $\vec{v}_{Modell,1 \ldots n}$ resulting from the farm speed $\vec{v}_{Park}$ which has been set are correlated with the undisrupted individual wind speeds and wind directions $\vec{v}_{Schätz,1 \ldots n}$ and a measure of the correlation of both variables is determined in step 540. In the example in FIG. 5, a quadratic distance is determined from both, which distance is intended to be as short as possible in order to achieve an optimum correlation. For this purpose, the farm wind speed $\vec{v}_{Park}$ which has been set is adapted until the correlation achieves a particular quality. All iterative optimization algorithms can be used as an alternative to the least squares method shown.

The optimized farm-effective wind speed $\vec{v}_{Park}$ is then determined in step 550 taking into account the shading matrix 200 and, for an unthrottled wind farm with power $P_{nom}$, the effective wind speed $v_i$ of each wind power installation is determined.

The available power of the farm $P_{verfg,Park}$ can then be determined and summed in step 560 using the power curves and the ascertained effective wind speeds of each of the wind power installations.

FIG. 6 schematically shows a fourth method d) for ascertaining the available powers $P_{verfg,Park}$ of the wind farm 112. Steps 510 and 520 correspond to the steps shown in FIG. 5.

The individual wind speeds and wind directions $\vec{v}_{Schätz,1 \ldots n}$ are supplied, in step 630, to an inverted shading matrix 200' in order to estimate a steady farm-effective wind speed and wind direction $v_{Park,1 \ldots n}$ together with the throttled power $P_{gedr}$. The shading matrix 200 is inverted in an installation-specific manner in order to arrive at the shading matrix 200'.

The steady farm-effective wind speed $\vec{v}_{Park,i}$ estimated for each wind power installation is averaged in step 640 and the averaged farm-effective wind speed $\vec{v}_{Park}$ is used in step 650 to determine effective wind speeds $v_{1 \ldots n}$ of each wind power installation using the shading matrix 200 for an unthrottled wind farm with a maximum power $P_{nom}$. In step 660, the effective wind speeds $v_{1 \ldots n}$ are then used to determine the available power of the wind farm $P_{verfg,Park}$ using the respective power curves and subsequent summation.

FIG. 7 schematically shows a fifth method e) for ascertaining the available power $P_{verfg,Park}$ of the wind farm 112. In contrast to the first to fourth methods, a large part of the method e) can be implemented on a controller of the wind power installation 100 since no operating information relating to the other wind power installations is required. More specifically, all steps combined under 710 can be implemented on the individual wind power installation. Each wind power installation ascertains an available power $P_{verfg,i}$ on the basis of ascertained individual wind speeds and wind directions $v_{Schätz,i}$ taking into account the shading acting on the individual installation, which is summarized as the aerodynamic farm efficiency in bracket 750. In step 720, the installation-specific estimation includes an estimation using the inverted shading matrix 200' with throttled power $P_{gedr}$ in order to estimate a farm-effective wind speed $\vec{v}_{Park}$. This is then used in step 730 to infer the installation-effective wind speed $v_i$ using the shading matrix 200 and the technically possible power or the nominal power $P_{nom}$. The installation-effective wind speed $v_i$ is then used in step 740 to estimate the available power $P_{verfg,i}$ using the power curve. The farm controller 760 must then include only the signals of the available power $P_{verfg,i}$ which are transmitted by the individual wind power installations 100, in step 770. The shading matrix 200 and the inverted shading matrix 200' can be provided in an installation-specific manner in this method e) and can be implemented on controllers of the respective wind power installations 100.

FIG. 8 shows a further method f) which is a variation of the method e) and, instead of the installation-specific speeds $v_{Schätz,i}$, takes into account the shading on the basis of the power values. In the method f) too, the wind farm controller 760 must only sum the individual signals of available power $P_{verfg,i}$ provided by the installations in step 770. The remaining steps can be implemented on the individual wind power installation in a similar manner to the method e). In step 810, an available power is calculated on the basis of the working point and optionally on the basis of sensor signals from the wind power installation. The available power $P_{verfg}$ which is individually calculated for all installations is used, together with the determined wind direction and the pitch angle, in step 820 to take into account the shading effects and to provide an available power $P_{verfg,i}$ corrected by shading effects.

The method f) combines individual steps of the method e) in one step 820; in particular, the inverse shading matrix 200', which is interpolated on the basis of the throttled power, and the shading matrix 200 of the unthrottled maximum technically possible supply are combined in such a manner that the intermediate step using the wind speed and direction valid throughout the farm in method e) can be dispensed with on the installation or the farm computer and is required only for the (one-off) calculation of the matrices 200, 200'.

For the shading matrix, a combination to form an aerodynamic efficiency, which only implicitly depends on the wind speed, is therefore carried out in step 820. In addition to the pitch angle $\alpha$, the minimum pitch angle $\alpha_{min}$, for which the wind power installation would be operated in the non-power-reduced case, that is to say with the maximum technically possible supply, is provided.

As already stated at the outset, a wind speed determined by a nacelle anemometer is regularly disrupted by rotor effects. Furthermore, the measured values from a nacelle anemometer have a good correlation with the actual power values from a wind power installation only in the case of averaging over long periods of 10 minutes and more and are therefore not particularly well suited to determining the currently available power, as can also be gathered from reference [1]. In addition, the anemometer measurement is greatly dependent on a power reduction and further influences which cannot be used to correct signals or can be used only with difficulty.

A second possibility, as likewise stated at the outset, is therefore to calculate the available power or the individual undisrupted wind speed from the current wind power installation power (for example the power of a wind power installation with full-scale converter which is fed into the DC intermediate circuit) and the blade angle of the wind power installation, which is described below with reference to FIG. 9.

If the power of a wind power installation is limited below the available power, the supply of mechanical power must be reduced. This can be carried out by increasing the blade angle. In this case, the reduction in the aerodynamic power coefficient $c_P(\lambda,\alpha)$ with an increase in the blade angle $\alpha$ generally depends on the tip-speed ratio $\lambda$.

If a wind power installation is now continuously operated at the same tip-speed ratio, in particular at the optimum tip-speed ratio $\lambda_{opt}$, even in the case of varying wind speeds as a result of known power or rotational speed control, a fixed power reduction results from the increase in the blade angle with respect to a particular optimum blade angle $\alpha_{opt}$. If the power-reducing effect is determined for each blade angle, the available power can be calculated from the current wind power installation power $P_{ist}$ and the power reduction coefficient $k(\alpha)=1-c_p(\lambda_{opt},\alpha)/c_p(\lambda_{opt},\alpha_{opt})$ according to the following formula:

$$P_{verfügbar} = \frac{P_{ist}}{1-k(\alpha)}$$

However, a constant tip-speed ratio cannot be maintained under all operating conditions. Deviations from the optimum may occur, in particular in the case of severe curtailment. On account of the inversely proportional relationship between the power reduction coefficient and the estimated available power, small deviations in the assumed power reduction coefficient may already result here in errors when calculating the available power, in particular in the case of severe curtailment.

In order to solve this, an algorithm is now proposed which can estimate the available power on the basis of the wind speed and therefore at all operating points of a wind power installation as reliably as possible.

FIG. 9 therefore shows a block diagram 1 of a proposed algorithm and therefore of a proposed method for determining an equivalent wind speed $v_{Wind}$ which can be used as an undisrupted wind speed $v_{Schätz}$ according to the methods described above.

Two observers which observe or estimate other values which cannot be measured on the basis of particular measurement variables are used in said algorithm.

The power observer 2 illustrated in FIG. 9 determines the available internal power, as the power $P_{ava,DC}$ available at the DC voltage intermediate circuit, from the power $P_{DC}$ fed into the DC voltage intermediate circuit and measured and the rotor rotational speed $\omega$.

The variables of rotational speed ($\omega$) and power in the DC intermediate circuit ($P_{DC}$) are therefore captured by means of measurement. The rotational speed ($\omega$) of the generator corresponds to the rotational speed of the rotor if there is no transmission. The available internal power $P_{ava,DC}$ is determined or calculated therefrom with the aid of the state observer 2, which available internal power can also be referred to as the available aerodynamic power based on the intermediate circuit ($\hat{P}_{ava,DC}$), that is to say it corresponds to the aerodynamic power minus the generator losses and possibly minus further losses such as friction or current conversion losses.

The power observer may be based on the following simplified system description which can also be referred to as an acceleration equation of a rotating single-mass system:

$$J\dot\omega = T_{mech} - T_{el} = \frac{1}{\omega}(P_{mech} - P_{el})$$

In this formula, J denotes the moment of inertia of the rotating masses of the wind power installation, $\omega$ denotes the rotational speed of the wind power installation, $T_{mech}$ and $P_{mech}$ denote the torque and power, respectively, arising at the shaft due to the wind and $T_{el}/P_{el}$ denote the electromechanical torque and the power, respectively, of the generator.

Here a dot once again denotes derivatives of variables with respect to time. If a generator power that exceeds the mechanical power is taken out over a period of time, the wind power installation consequently decelerates.

For the power observer 2 and proceeding from the acceleration equation of a rotating single-mass system, above, it is possible to set up the following state space model of the wind power installation, having the state variables of rotational speed ($\omega$) and mechanical torque ($T_{mech}$):

$$\begin{bmatrix} \dot{\omega} \\ \dot{T}_{mech} \end{bmatrix} = \begin{bmatrix} 0 & \frac{1}{J} \\ 0 & 0 \end{bmatrix} \begin{bmatrix} \omega \\ T_{mech} \end{bmatrix} + \begin{bmatrix} -\frac{1}{J} \\ 0 \end{bmatrix} T_{el}$$

Of the variables used here, it is not possible to measure the mechanical torque $T_{mech}$ and therefore the latter should be calculated from the measurement data by way of a state observer. Since, moreover, the rotational speed signal often is only measured with a low resolution and with a low sampling rate, a state observation is proposed for this value, too. A suitable observer structure can be formulated as follows, with reference being made to reference [4] for further explanation:

$$\begin{bmatrix} \dot{\hat{\omega}} \\ \dot{\hat{T}}_{mech} \end{bmatrix} = \begin{bmatrix} -k_\omega & \frac{1}{J} \\ -k_T & 0 \end{bmatrix} \begin{bmatrix} \hat{\omega} \\ \hat{T}_{mech} \end{bmatrix} + \begin{bmatrix} k_\omega & -\frac{1}{J} \\ k_T & 0 \end{bmatrix} \begin{bmatrix} \omega \\ T_{el} \end{bmatrix}$$

Here, in contrast to the measured input variables of rotational speed w and electrical torque $$T_{el} = \frac{P_{DC}}{\omega},$$

observed variables are denoted by $\hat{}$. $P_{DC}$ is the electrical power fed into the DC voltage intermediate circuit. The two parameters $k_\omega$, and $k_T$ influence the dynamic behavior and, in the case of a time-discrete implementation, the stability of the state observer, too, and have to be chosen taking these aspects into account.

The aerodynamic power $\hat{P}_{ava,DC}$ is calculated by way of the product of rotational speed and torque. Then, this corresponds to the determined available internal power $P_{ava,DC}$.

Input variables for determining the available internal power $P_{ava,DC}$ are the measured electrical power $P_{DC}$ that is fed into the DC intermediate circuit and the measured wind power installation rotational speed $\omega$. Then, the available electrical power, in relation to the DC intermediate circuit, $P_{ava,DC}$ is the output value. This observer is important since the wind power installation, under certain circumstances, is not at a steady operating point at which the power $P_{DC}$ corresponds to the currently available wind power, said wind power installation instead almost permanently accelerating or decelerating during normal operation and, for example, possibly deviating from a normal rotational speed-power characteristic for network support, in which energy is taken from kinetic energy of the rotation.

The generator losses $P_{vGen}$ are added to the available internal power $P_{ava,DC}$ that is related to the DC intermediate circuit. These losses can either be determined by measurements during operation or can be gathered from a characteristic for the respective generator working point (optionally taking account of temperature measured values). Additionally, if relevant, friction and current conversion losses can also be added thereto. The result of this addition is the available generator input power of the wind power installation, referred to in a simplifying manner as $P_{mech}$. For this calculation, the generator losses expected for the maximum available input power should be used instead of the current generator losses.

This power and the measured wind power installation rotational speed Co and the current blade angle $\alpha$ are used as input values for the second observer, the wind observer 4. The latter observes the wind speed $v_{Wind}$ that leads to the available power at the current blade angle $\alpha$. In principle, this relates to a solution v to the equation $$P_{mech} = \frac{1}{2} \rho A v^3 C_p(\lambda, \alpha),$$

where $P_{mech}$ is assumed to be known from the power observer 2, $\rho$ denotes the air density, A denotes the rotor area and $C_p$ ($\lambda,\alpha$) denotes the power coefficient depending on the tip-speed ratio $\lambda$ and the blade angle $\alpha$. This is a nonlinear equation, in which the wind speed v is included directly and indirectly via the tip-speed ratio $$\lambda = \frac{\omega R}{v}$$

($\omega$ in turn denotes the wind power installation rotational speed in rad/s and R denotes the radius of the aerodynamic rotor). Different solutions thereto are known from reference [2].

On account of the nonlinear properties of the equation, a nonlinear approach to determining the wind speed as the basis for the wind observer was found to be advantageous and reference is made in this respect to references [2, 3], listed under the phrase immersion and invariance.

However, in contrast to references [2] and [3], it is not the measured electrical wind power installation power that is used as an input variable for the wind observer 4 in the solution proposed here, but instead the available internal power that is determined or calculated by way of the power observer 2. This is important for the correct, at least desired functionality of the wind observer 4 in the transient operation of the wind power installation (i.e., in the case of strong acceleration or deceleration, for example for network support, in which energy is taken from kinetic energy of the rotation). Preferably, the wind observer 4 also additionally outputs the available power Pava ($\alpha_{opt},\lambda_{opt}$) of the wind power installation. This is the power that could be produced by the wind power installation at the equivalent wind speed $v_{Wind}$, determined by the wind observer 4, if the optimum blade angle $\alpha_{opt}$ and the optimum tip-speed ratio $\lambda_{opt}$ were set. By way of example, this can be calculated on the basis of the equivalent wind speed $v_{Wind}$ and taking account of known relationships between wind and produced power in the specified conditions (optimum blade angle $\alpha_{opt}$ and optimum tip-speed ratio $\lambda_{opt}$). By way of example, an appropriate characteristic can be stored to this end. Additionally, it is proposed to output the current tip-speed ratio $\lambda$ which can be calculated from the wind speed, rotational speed and rotor diameter. The stated available power $P_{verf}$ ($\alpha_{opt},\lambda_{opt}$) would be the available power not corrected by farm effects. Whereas the methods a) to e), for example, are based directly on the determined equivalent wind speed $v_{Wind}$ as the input variable for determining the farm-available power, the method f) can be based on the available power $P_{verf}(\alpha_{opt}, \lambda_{opt})$.

The proposed solution can be used for applications of positive and negative balancing energy with wind energy, both primary balancing energy and secondary balancing energy. Here, the improved accuracy, in particular, can be important. The solution can be used as a replacement for a second nacelle anemometer.

By correctly determining the undisrupted wind speed, at least determining the latter with high accuracy, it is possible to calculate the maximum available power of the wind power installation in many operating states. This allows the correct, at least relatively accurate, determination of, e.g., negative balancing power provided, where a wind power installation or a wind farm has to reduce its power by a certain value below the available power. Furthermore, the requirement for a second wind meter, for example for satisfying requirements directed at safety, may be solved by means of software instead of hardware.

The proposed solution is at least an improvement over previously known solutions. The core problem of determining the wind speed lies in solving the aerodynamic power equation:

$$P_{mech} = \frac{1}{2}\rho A v^3 C_p(\lambda, \alpha), \quad (1)$$

where $\rho$ denotes the air density, A denotes the rotor area, which can synonymously also be referred to as the rotor blade area, v denotes the wind speed and $C_p(\lambda, \alpha)$ denotes the power coefficient as a function of the tip-speed ratio $\lambda$ and the blade angle $\alpha$. Even though, strictly speaking, this equation denotes the mechanical power of the rotor at the generator rotor, it can be determined approximately from the measured electrical power and the estimated or calculated generator losses and can therefore be assumed to be known, albeit as a variable afflicted by noise. The difficulty in solving this equation for the unknown v lies in the twofold input of the variables into the equation, both directly ($v^3$) and via the tip-speed ratio $$\lambda = \frac{\omega_m R}{v}$$

($\omega_m$ once again denotes the wind power installation rotational speed in rad/s).

A numerically efficient and, at the same time, accurate solution according to reference [2] can be obtained by way of an observer according to the "immersion and invariance" principle, as shown in reference [3]. To this end, the following system of state equations is implemented:

$$\dot{\hat{v}}_w^I = \gamma\left[\frac{1}{J}\frac{P_{mech}}{\omega_m} - \Phi(\omega_m, \hat{v}_w^I + \gamma\omega_m)\right], \quad (2)$$

$$\hat{v}_w = \hat{v}_w^I + \gamma\omega_m, \quad (3)$$

where $$\Phi(\omega_m, v_w) = \frac{1}{2}\rho\frac{A}{J}\frac{v_w^3}{\omega_m}C_p\left(\frac{r\omega_m}{v_w}, \alpha\right),$$

J denotes the moment of inertia of the wind power installation rotor, $P_{mech}$ denotes the available DC power of the generator, estimated by the power observer, plus the generator losses, $\gamma > 0$ is an adjustable adaptation parameter of the filter, $\rho$ denotes the air pressure, A denotes the rotor area and r denotes the rotor radius of the wind power installation. The derivative of the variable $\hat{v}_w^I$ with respect to time is denoted by a dot.

The output values of the wind observer are calculated by numerically solving this system of state equations. Here, the variable $\hat{v}_w$ calculated in equation (3) forms the estimated wind speed $v_{Wind}$. The estimated tip-speed ratio $\lambda$ then emerges from the measured rotational speed and the estimated wind speed according to the aforementioned equation. The available power emerges from the solution of equation (1) while taking account of losses arising in the wind power installation at the estimated optimum working point and of possible technical or operational restrictions, which may result in a limitation of this available power.

A decisive modification of the wind observer described here in relation to the solution described in reference [3] lies in the use of an available power, estimated by a separate observer, for the calculation of $\dot{\hat{v}}_w^I$ (equation (2)). By contrast, the measured electrical power or the electrical torque is used directly in reference [3], under the assumption that the wind power installation in the partial load range is always operated near its optimum operating point. However, in practice, there is a significant deviation between the current electrical power and the power achievable at the optimum operating point, or the power available in the wind, on account of acceleration and deceleration processes in the case of a variable wind speed and, in part, also as desired on account of certain requirements such as network frequency support, in which energy is taken from kinetic energy of the rotation, and so a separate determination of the available power is proposed prior to solving the aerodynamic power equation by way of the wind observer for the purposes of accurately determining the wind speed at all operating points.

A further deviation in relation to the solution presented in reference [3] consists of taking account of the current blade angle $\alpha$ when determining the power coefficient $C_p(\lambda, \alpha)$. This is of decisive importance for using the wind observer to determine the maximum possible power since the blade angle, as a rule, is greater than the optimum blade angle in the curtailed operation of a wind power installation. Consequently, for determining the maximum available power, the wind speed estimated by the wind observer and the calculation of the power coefficient for this wind speed and the optimum blade angle $\alpha_{opt}$ and an optimum tip-speed ratio $\lambda_{opt}$, i.e., $C_p(\lambda_{opt}, \alpha_{opt})$ and the solution of the aerodynamic power equation (1) with the estimated wind speed and the optimum $C_p(\lambda_{opt}, \alpha_{opt})$ are advantageous.

An alternative but complicated model is known from reference [5], for example.

Consequently, an improvement in the accuracy of determining the available power in the case of strong curtailment is created.

Particular advantages of the solution shown with reference to FIG. 9 may consist in
- determining the available power at, where possible, all working points at which the wind power installation is in operation,
- taking account of operating states in which the wind power installation deviates from its steady working point, inter alia when providing network services, determining the equivalent wind speed in the rotor plane without additional sensor systems and, moreover determining the rotational speed and acceleration of the wind power installation in a highly accurate manner in the case of an appropriate implementation.

In joint consideration with the methods described in FIG. 3 to FIG. 8, particularly good, simple and accurate determination of the available farm power can be achieved in combination.

REFERENCES

[1] K. E. Johnson, L. Y. Pao, M. J. Balas, L. J. Fingersh: Control of Variable-Speed Wind Turbines—Standard and Adaptive Techniques for Maximizing Energy Capture. IEEE Control Systems Magazine, June 2006, pages 70-81.
[2] M. N. Soltani, T. Knudsen, M. Svenstrup, R. Wisniewski, P. Brath, R. Ortega, K. Johnson: Estimation of Rotor Effective Wind Speed: A Comparison. IEEE Transactions on Control Systems Technology, 21(4), July 2013, pages 1155-1167.
[3] R. Ortega, F. Macilla-David, F. Jaramillo: A Globally Convergent Wind Speed Estimator for Windmill Systems. In Proc. 2011 50$^{th}$ IEEE Conference on Decision and Control, Orlando, Fla., USA, December 2011, pages 6079-6084.
[4] C. M. Verrelli, A. Savoia, M. Mengoni, R. Marino, P. Tomei, L. Zarri: On-line Identification of Winding Resistances and Load Torque in Induction Machines. IEEE Transactions on Control Systems Technology, vol. 22(4), July 2014.
[5] T. Göçmen, G. Giebel, P.-E. Réthoré, J. P. Murcia Leon, J. R. Kristoffersen: Uncertainty Quantification of the Real-Time Reserves for Offshore Wind Power Plants, WindEurope Summit, September 2016

The invention claimed is:

1. A method for determining an available power of a wind farm, wherein the wind farm comprises a plurality of wind power installations with a rotor having a plurality of rotor blades, wherein blade angles of the plurality of rotor blades are adjustable, the method comprising:
 providing or using a shading matrix to determine an effective wind speed of each of the plurality of wind power installations in the wind farm as a function of at least one: wind speed, wind direction, and wind farm throttling using a farm wake model; and
 determining the available power of the wind farm based on the effective wind speed of each of the plurality of wind power installations,
 wherein the method for determining the available power of the wind farm comprises:
  determining a first set of the plurality of wind power installations having freely inflowing wind for a particular wind direction;
  ascertaining an average wind speed and wind direction as an average value of the wind speeds and wind directions of the first set of the plurality of wind power installations with freely inflowing wind;
  ascertaining an effective wind speed of each wind power installation for each of the plurality of wind power installations without freely inflowing wind from the average wind speed and wind direction taking into account the shading matrix for an unthrottled wind farm;
  ascertaining an available power of each of the plurality of wind power installations based on their power curve and the ascertained effective wind speed; and
  ascertaining the available power of the wind farm by summing the available powers of each of the plurality of wind power installations.

2. The method as claimed in claim 1, further comprising determining the shading matrix from a maximum installation power.

3. The method as claimed in claim 1, wherein the farm wake model is adaptive and comprises a self-learning method for adapting to changes in environment and for correcting errors in the farm wake model.

4. The method as claimed in claim 3, wherein different shading matrices are provided based on different farm wake models, wherein one of the shading matrices is selected based on a parameter indicative of atmospheric stability or a parameter interpolated between different shading matrices.

5. The method as claimed in claim 1, further comprising low-pass filtering for correcting errors in the available power.

6. A method for determining an available power of a wind farm, wherein the wind farm comprises a plurality of wind power installations with a rotor having a plurality of rotor blades, wherein blade angles of the plurality of rotor blades are adjustable, the method comprising:
 providing or using a shading matrix to determine an effective wind speed of each of the plurality of wind power installations in the wind farm as a function of at least one: wind speed, wind direction, and wind farm throttling using a farm wake model; and
 determining the available power of the wind farm based on the effective wind speed of each of the plurality of wind power installations,
 wherein the method for determining the available power of the wind farm comprises:
  determining a first set of the plurality of wind power installations having freely inflowing wind for a particular wind direction;
  determining a wind speed and wind direction for the first set of the plurality of wind power installations with freely inflowing wind;
  ascertaining effective wind speeds of a second set of the plurality of wind power installations without freely inflowing wind taking into account the shading matrix for an unthrottled wind farm for each of the determined wind speeds and wind directions of the first set of the plurality of wind power installations with freely inflowing wind;
  ascertaining an installation-specific average effective wind speed, for at least the second set of the plurality of wind power installations without freely inflowing wind, as an average value of the effective wind speeds ascertained for each wind power installation with freely inflowing wind;
  ascertaining an available power of each of the plurality of wind power installations based on their power curve and the average effective wind speed ascertained in an installation-specific manner; and
  ascertaining the available power of the wind farm by summing the available powers of each wind power installation.

7. The method as claimed in claim 6, further comprising providing the available power of the wind farm in real time.

8. The method as claimed in claim 6, wherein determining the available power is also based on losses of a network of the wind farm.

9. A method for determining an available power of a wind farm, wherein the wind farm comprises a plurality of wind power installations with a rotor having a plurality of rotor blades, wherein blade angles of the plurality of rotor blades are adjustable, the method comprising:

provviding or using a shading matrix to determine an effective wind speed of each of the plurality of wind power installations in the wind farm as a function of at least one: wind speed, wind direction, and wind farm throttling using a farm wake model; and determining the available power of the wind farm based on the effective wind speed of each of the plurality of wind power installations, wherein the method for determining the available power of the wind farm comprises:

ascertaining individual wind speeds and wind directions of the plurality of wind power installations;

calculating modeled wind speeds and wind directions based on a set farm-effective wind speed and wind direction taking into account the shading matrix and the wind farm throttling;

optimizing the set farm-effective wind speed and wind direction based on a comparison of individual wind speeds and wind directions and the modeled wind speeds and wind directions;

ascertaining the effective wind speed of each wind power installation from the optimized set farm-effective wind speed and wind direction taking into account the shading matrix for an unthrottled wind farm;

ascertaining an available power of each of the plurality of wind power installations based on their power curve and the ascertained effective wind speed; and ascertaining the available power of the wind farm by summing the available powers of each of the plurality of wind power installations.

10. The method as claimed in claim 9, further comprising storing the shading matrix for each wind power installation as a table based on the farm-effective wind speed and direction and a maximum farm power.

11. The method as claimed in claim 9, wherein determining the available power of the wind farm is also based on air density.

12. The method as claimed in claim 9, wherein an effective wind direction of each wind power installation is ascertained taking into account the shading matrix.

13. A wind farm comprising a plurality of wind power installations, wherein the wind farm includes a controller configured to carry out the method as claimed in claim 9.

14. A method for determining an available power of a wind farm, wherein the wind farm comprises a plurality of wind power installations with a rotor having a plurality of rotor blades, wherein blade angles of the plurality of rotor blades are adjustable, the method comprising:

providing or using a shading matrix to determine an effective wind speed of each of the plurality of wind power installations in the wind farm as a function of at least one: wind speed, wind direction, and wind farm throttling using a farm wake model; and determining the available power of the wind farm based on the effective wind speed of each of the plurality of wind power installations, wherein the method for determining the available power of the wind farm comprises:

determining a wind speed and wind direction for each of the plurality of wind power installations;

inverting the shading matrix for each of the plurality of wind power installations to estimate a steady farm-effective wind speed and wind direction based on the individual wind speed and wind direction of the respective wind power installation and the wind farm throttling;

ascertaining the effective wind speed of each wind power installation from the respectively estimated steady farm-effective wind speed and wind direction taking into account the shading matrix for an unthrottled wind farm;

ascertaining an available power of each of the plurality of wind power installations based on their power curve and the respective ascertained effective wind speed; and ascertaining the available power of the wind farm by summing the available powers of each of the plurality of wind power installations.

15. The method as claimed in claim 14, further comprising:

averaging all estimated farm-effective wind speeds and wind directions;

wherein ascertaining the effective wind speed of each wind power installation comprises ascertaining the effective wind speed of each wind power installation from the averaged farm-effective wind speed and wind direction taking into account the shading matrix for the unthrottled wind farm.

16. A wind power installation in a wind farm, wherein the wind power installation includes a controller configured to carry out the method as claimed in claim 14.

17. A method for determining an available power of a wind farm, wherein the wind farm comprises a plurality of wind power installations with a rotor having a plurality of rotor blades, wherein blade angles of the plurality of rotor blades are adjustable, the method comprising:

providing or using a shading matrix to determine an effective wind speed of each of the plurality of wind power installations in the wind farm as a function of at least one: wind speed, wind direction, and wind farm throttling using a farm wake model;

determining the available power of the wind farm based on the effective wind speed of each of the plurality of wind power installations; and correcting the wind speed and wind direction based on spreading of wind field through the farm, wherein the correcting is carried out as a weighted sliding average value.

18. The method as claimed in claim 17, further comprising:

determining an average wind speed and wind direction acting on a rotor of at least one wind power installation based on an operating point of the at least one wind power installation.

19. The method as claimed in claim 18, wherein determining the average wind speed comprises:

interpolation from at least three-dimensional tables of the wind speed as a function of a rotational speed, an aerodynamic power, and a pitch angle; and iteration based on a family of characteristics as a function of a tip-speed ratio and a pitch angle.

20. The method as claimed in claim 17, wherein the sliding average value is adapted based on a flow time.

21. The method as claimed in claim 17, wherein determining the available power is also based on further limitations associated with one or more of technical, maintenance, reduced-sound operation and shadowing of the plurality of wind power installations in the wind farm.

22. A method for determining an available power of a wind farm, wherein the wind farm comprises a plurality of wind power installations with a rotor having a plurality of rotor blades, wherein blade angles of the plurality of rotor blades are adjustable, the method comprising:

providing or using a shading matrix to determine an effective wind speed of each of the plurality of wind power installations in the wind farm as a function of at least one: wind speed, wind direction, and wind farm throttling using a farm wake model; and determining the available power of the wind farm based on the effective wind speed of each of the plurality of wind power installations, wherein the farm wake model is adaptive and comprises a self-learning method for adapting to changes in environment and for correcting errors in the farm wake model, wherein different shading matrices are provided based on different farm wake models, wherein one of the shading matrices is selected based on a parameter indicative of atmospheric stability or a parameter interpolated between different shading matrices, and wherein each of the different farm wake models are based on different wake decay constants.

* * * * *